(12) United States Patent
Southall et al.

(10) Patent No.: US 12,093,511 B2
(45) Date of Patent: Sep. 17, 2024

(54) DATA ANALYTICS SYSTEM USING INSIGHT PROVIDERS

(71) Applicant: SAP SE, Walldorf (DE)

(72) Inventors: Alan Southall, Walldorf (DE); Anubhav Bhatia, Sunnyvale, CA (US); Hermann Lueckhoff, Sunnyvale, CA (US); Olaf Meincke, Heidelberg (DE); Reghu Ram Thanumalayan, Walldorf (DE); Thomas Hettel, Schwetzingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/817,698

(22) Filed: Aug. 5, 2022

(65) Prior Publication Data
US 2022/0382425 A1    Dec. 1, 2022

Related U.S. Application Data

(63) Continuation of application No. 15/369,543, filed on Dec. 5, 2016, now Pat. No. 11,455,080.

(51) Int. Cl.
*G06F 3/00* (2006.01)
*G06F 3/0484* (2022.01)
(Continued)

(52) U.S. Cl.
CPC ............ *G06F 3/0484* (2013.01); *G06F 16/26* (2019.01); *G06Q 10/063* (2013.01)

(58) Field of Classification Search
CPC ..... G06F 16/26; G06F 3/0484; G06Q 10/063; G08G 1/20
(Continued)

(56) References Cited

U.S. PATENT DOCUMENTS 7,171,478 B2    1/2007    Lueckhoff et al.
7,213,209 B2    5/2007    Lueckhoff et al.
(Continued)

OTHER PUBLICATIONS

Final Office Action issued in U.S. Appl. No. 15/369,354 on Jan. 21, 2020, 15 pages.
(Continued)

*Primary Examiner* — Vincent F Boccio
(74) *Attorney, Agent, or Firm* — Fish & Richardson P.C.

(57) ABSTRACT

Methods, systems, and computer-readable storage media for providing insight providers, each including a logic component and a configuration component, each logic component including a respective domain-specific model, and each configuration component including parameter values for processing data using the respective domain-specific model, receiving a set of assets including data indicative of one or more assets, retrieving asset data associated with the set of assets, the asset data including OT data and IT data, the OT data being provided from networked devices, the IT data being provided from one or more enterprise systems, processing the OT data and the IT data using respective domain-specific models of the logic components of the insight providers to provide a result set, the result set including one or more of a second set of assets and enriched data, and transmitting graphical representations for display in GUI that are respectively specific to an insight provider.

20 Claims, 12 Drawing Sheets

(51) Int. Cl.
*G06F 16/26* (2019.01)
*G06Q 10/063* (2023.01)

(58) Field of Classification Search
USPC .......................................................... 707/755
See application file for complete search history.

(56) References Cited

U.S. PATENT DOCUMENTS

| | | | |
|---|---|---|---|
| 7,263,520 B2 | 8/2007 | Biedenstein et al. | |
| 7,269,606 B2 | 9/2007 | Dittrich et al. | |
| 7,373,354 B2 | 5/2008 | Dittrich et al. | |
| 7,376,902 B2 | 5/2008 | Lueckhoff | |
| 7,412,494 B2 | 8/2008 | Dittrich et al. | |
| 7,584,163 B2 | 9/2009 | Altenhofen et al. | |
| 7,650,326 B2 | 1/2010 | Biedenstein et al. | |
| 7,752,301 B1 | 7/2010 | Malocco | |
| 7,809,771 B2 | 10/2010 | Dittrich et al. | |
| 8,005,900 B2 | 8/2011 | Lueckhoff | |
| 8,150,888 B2 | 4/2012 | Dittrich et al. | |
| 8,392,573 B2 | 3/2013 | Lehr et al. | |
| 8,418,178 B2 | 4/2013 | Dumas et al. | |
| 8,453,127 B2 | 5/2013 | Balko et al. | |
| 8,527,440 B2 | 9/2013 | Hettel | |
| 8,531,451 B2 | 9/2013 | Mital et al. | |
| 8,660,868 B2 | 2/2014 | Vogel et al. | |
| 8,924,565 B2 | 12/2014 | Lehr et al. | |
| 8,935,207 B2 | 1/2015 | Wankawala et al. | |
| 9,079,505 B1* | 7/2015 | Hyde | G08G 1/202 |
| 9,122,669 B2 | 9/2015 | Demant et al. | |
| 9,367,421 B2 | 6/2016 | Gilbao | |
| 9,582,495 B2 | 2/2017 | Song | |
| 10,762,513 B2 | 9/2020 | Southall et al. | |
| 2004/0093408 A1 | 5/2004 | Hirani | |
| 2007/0106549 A1 | 5/2007 | Stocking | |
| 2008/0084324 A1* | 4/2008 | Wallace | G06Q 10/06 340/679 |
| 2008/0125965 A1* | 5/2008 | Carani | G08G 1/13 340/539.13 |
| 2008/0154937 A1 | 6/2008 | Sattler et al. | |
| 2008/0155391 A1 | 6/2008 | Sattler et al. | |
| 2010/0161827 A1* | 6/2010 | Griesmer | H04L 12/2869 709/232 |
| 2011/0145518 A1 | 6/2011 | Balko et al. | |
| 2011/0153519 A1 | 6/2011 | Balko et al. | |
| 2011/0276396 A1 | 11/2011 | Rathod | |
| 2012/0109661 A1 | 5/2012 | Lueckhoff | |
| 2012/0224057 A1* | 9/2012 | Gill | G06Q 10/063 348/143 |
| 2013/0079938 A1 | 3/2013 | Lee et al. | |
| 2013/0080210 A1* | 3/2013 | Vogel | G06Q 10/06 705/7.33 |
| 2014/0129942 A1 | 5/2014 | Rathod | |
| 2015/0341230 A1 | 11/2015 | Dave et al. | |
| 2015/0363386 A1 | 12/2015 | Song | |
| 2016/0238406 A1* | 8/2016 | Burtner | G06F 16/2322 |
| 2017/0192414 A1 | 7/2017 | Mukkamala et al. | |
| 2017/0316385 A1 | 11/2017 | Joshi | |
| 2018/0157698 A1 | 6/2018 | Southall et al. | |
| 2018/0157982 A1 | 6/2018 | Southall et al. | |
| 2020/0349589 A1 | 11/2020 | Southall et al. | |

OTHER PUBLICATIONS

Final Office Action issued in U.S. Appl. No. 15/369,543 on Apr. 5, 2019, 16 pages.
Final Office Action issued in U.S. Appl. No. 15/369,543 on May 13, 2020, 32 pages.
Non Final Office Action issued in U.S. Appl. No. 15/369,543 on Oct. 4, 2018, 12 pages.
Non-Final Office Action issued in U.S. Appl. No. 15/369,354, dated Jul. 25, 2019, 21 pages.
Non-Final Office Action issued in U.S. Appl. No. 15/369,543 on Sep. 9, 2019, 21 pages.
Non-Final Office Action in U.S. Appl. No. 16/935,324, dated Apr. 3, 2023, 18 pages.

* cited by examiner

FIG. 4A

DATA ANALYTICS SYSTEM USING INSIGHT PROVIDERS

CLAIM OF PRIORITY

This application claims priority under 35 USC § 120 to U.S. patent application Ser. No. 15/369,543, filed on Dec. 5, 2016, entitled "DATA ANALYTICS SYSTEM USING INSIGHT PROVIDERS", the entire contents of which are hereby incorporated by reference.

BACKGROUND

Data analytics can be used in multiple contexts. An example context can include predictive maintenance of devices. For example, data associated with a device can be analyzed to predict when and/or what type of maintenance may be needed to maintain acceptable operation of the device. Data analytics, however, can be resource intensive (e.g., in terms of technical resources such as processors, memory, bandwidth), and can require a relatively high skill level (e.g., data science and domain expert with engineering background) for review and action based on analytical results. These constraints can inhibit a broader use of data analytics.

SUMMARY

Implementations of the present disclosure include computer-implemented methods for data analytics. In some implementations, actions include providing a plurality of insight providers, each insight provider including a logic component and a configuration component, each logic component including a respective domain-specific model, and each configuration component including one or more parameter values for processing data using the respective domain-specific model, receiving a first set of assets including data indicative of one or more assets, retrieving asset data associated with at least one asset of the first set of assets, the asset data including operational technology (OT) data and information technology (IT) data, the OT data being provided from one or more networked devices, the IT data being provided from one or more enterprise systems, processing the OT data and the IT data using respective domain-specific models of the logic components of the insight providers to provide a first result set, the first result set including one or more of a second set of assets and enriched data, and transmitting one or more graphical representations for display in a plurality of graphical user interface (GUIs) that are respectively specific to an insight provider of the plurality of insight providers, each the one or more graphical representations being at least partially based on one or more of the first result set and the second set of assets, and being provided from visualization components of the respective insight providers. Other implementations of this aspect include corresponding systems, apparatus, and computer programs, configured to perform the actions of the methods, encoded on computer storage devices.

These and other implementations can each optionally include one or more of the following features: actions further include receiving user input provided through a first GUI of the plurality of GUIs, the user input indicating a sub-set of assets selected by the user, processing, by a first insight provider associated with the first GUI, asset data associated with the sub-set of assets to provide input to a second insight provider, and transmitting one or more revised graphical representations to the first GUI and a second GUI associated with the second insight provider, each of the one or more revised graphical representations being based on one or more of the sub-set of assets, and the input to the second insight provider; the second insight provider executes in a data enrichment mode to provide enriched data, at least one graphical representation comprising the enriched data; the first insight provider executes in a filter mode, and the input includes at least one asset of the sub-set of assets; at least two insight providers of the plurality of insight providers are configured into an insight provider pipeline; the data indicative of one or more assets at least partially includes identifiers respectively assigned to the one or more assets, and retrieving asset data includes querying one or more data stores based on the identifiers; and a domain includes predictive maintenance of physical assets, and each domain-specific model is associated with a respective aspect of the predictive maintenance.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 4A-4G depict screenshot of an example graphical user interface (GUI) progression in accordance with implementations of the present disclosure.

Like reference symbols in the various drawings indicate like elements.

DETAILED DESCRIPTION

Implementations of the present disclosure are generally directed to data analytics systems. More particularly, implementations of the present disclosure provide computer-implemented insight providers that each provide a specific, self-contained analysis for a particular domain. In some examples, each insight provider operates in one of a filter mode, and a data enrichment mode. In some examples, a plurality of insight providers can be linked to provide an insight provider pipeline, such that an output of an insight provider is provide as input to another insight provider. Implementations can include actions of providing insight providers, each including a logic component and a configuration component, each logic component including a respective domain-specific model, and each configuration component including parameter values for processing data using the respective domain-specific model, receiving a set of assets including data indicative of one or more assets, retrieving asset data associated with the set of assets, the asset data including OT data and IT data, the OT data being provided from networked devices, the IT data being provided from one or more enterprise systems, processing the OT data and the IT data using respective domain-specific models of the logic components of the insight providers to provide a result set, the result set including one or more of a second set of assets and enriched data, and transmitting graphical representations for display in GUI that are respectively specific to an insight provider.

Implementations of the present disclosure further provide a data analytics system leveraging a plurality of insight providers, and providing a portal having a plurality of graphical user interfaces (GUIs), which are driven based on one or more insight providers. In some implementations, and as described in further detail herein, a user provides input to one or more GUIs, which input is processed by respective insight providers to orchestrate the insight providers in data analytics. In some examples, the user is able to interact with the insight providers through the GUIs to drill-down into data analytics information related to assets, and/or perform tasks associated with assets.

Implementations of the present disclosure are described in further detail herein with reference to an example context of data analytics for predictive maintenance. In some examples, data is processed using one or more insight providers of the present disclosure to provide maintenance data on one or more devices, and/or to perform tasks associated with assets (e.g., issuing maintenance tickets). It is contemplated, however, that implementations of the present disclosure can be applied in an appropriate context.

Figure 1:
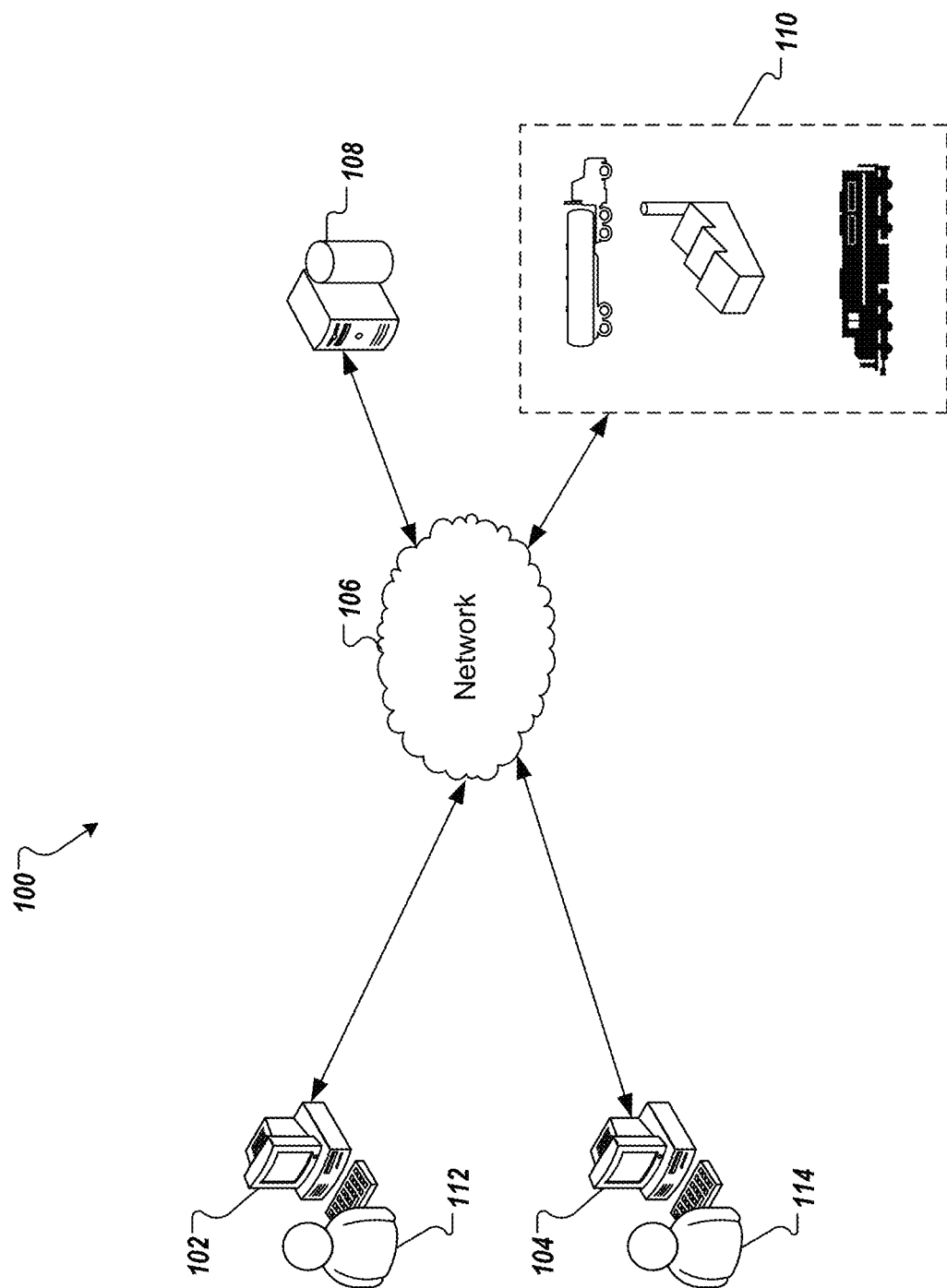
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, 104, a network 106, a server system 108, and assets 110. The server system 108 includes one or more server devices and databases (e.g., processors, memory). In the depicted example, respective users 112, 114 interact with the client devices 102, 104. In an example context, the users 112, 114 can include users (e.g., enterprise operators, maintenance agents), who interact with one or more a data analytics system hosted by the server system 108.

In some examples, the client devices 102, 104 can communicate with the server system 108 over the network 106.

In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

In some implementations, one or more data stores of the server system 108 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

In accordance with the example context, the assets 110 can include entities, for which predictive maintenance is to be conducted. Example assets can include, without limitation, cars, trucks, trains, planes, boats, ships, buildings, factories, or components thereof (e.g., engine, motor, compressor, HVAC unit, etc.). In general, an asset can include any appropriate entity, for which data can be provided, and data analytics can be performed. In some examples, data associated with each asset 110 is provided to the server system 108 over the network 106, which data is processed by the data analytics system, as described in further detail herein.

In some implementations, data includes information technology (IT) data, and operational technology (OT) data. In some examples, IT data includes data provided from one or more enterprise systems. For example, an enterprise system can include an inventory of assets managed by a respective enterprise, the inventory recording assets by respective identifiers (unique identifiers), and other relevant information (e.g., description, part number, location). In some examples, IT data is stored in a data store (e.g., of the server system 108), and can be retrieved based on identifiers associated with assets. For example, a database can be queried based on an asset identifier, and IT data associated with the respective asset can be provided in response to the query.

In some examples, OT data includes data provided from one or more sensors. Example sensors can include sensors integrated into an asset (e.g., environmental (pressure, temperature) sensors, speed (RPM) sensors, fluid (oil, coolant) level sensors. Example sensors can include sensors that are independent of an asset, but that monitor data associated with the asset (e.g., video cameras, environmental (pressure, temperature) sensors, motion sensors). For example, sensors can be included in a networked device that is proximate to an asset, and that provides data relevant to the asset. In some examples, OT data is stored in a data store (e.g., of the server system 108), and can be retrieved based on identifiers associated with assets, and/or identifiers assigned to sensors associated with assets. For example, a video camera monitors a particular asset and includes an identifier. An identifier of the video camera can be correlated to an identifier of the asset, and recorded in the enterprise system. Data provided by the video camera (e.g., video, images) can be stored in a database based on the identifier of the video camera and/or the identifier of the asset. The data can be queried based on the asset identifier and/or the video camera identifier, and OT data associated with the respective asset can be provided in response to the query.

As introduced above, and described in further detail herein, implementations of the present disclosure provide a data analytics system including a plurality of insight providers. In some examples, the data analytics system is provided as one or more computer-executable programs executed by one or more computing devices. For example, the data analytics system can be hosted by one or more server systems (e.g., the server system 108 of FIG. 1). In some examples, each insight provider is provided as one or more computer-executable programs executed by one or more computing devices.

Figure 2:
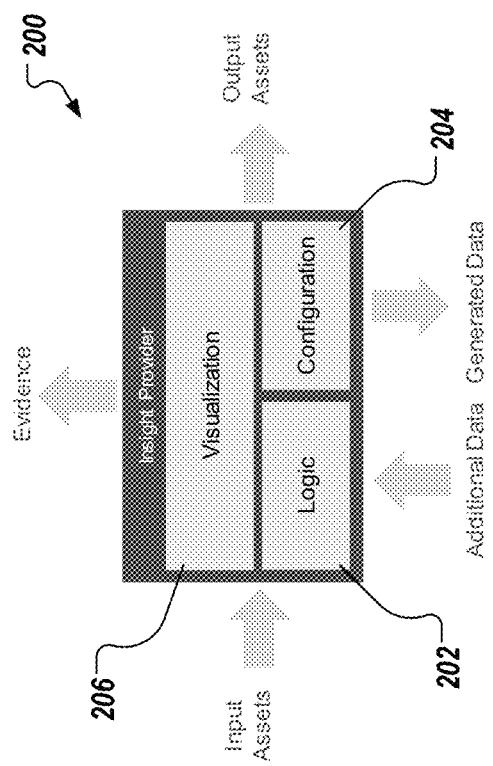
FIG. 2 depicts an example insight provider in accordance with implementations of the present disclosure.

FIG. 2 depicts an example insight provider 200 in accordance with implementations of the present disclosure. The example insight provider 200 includes a logic component 202, a configuration component 204, and a visualization component 206. The example insight provider 200 receives input assets, and/or additional data, and provides output assets, evidence, and/or generated data.

In some implementations, the logic component 202 includes computer-programmed logic that processes data based on the input assets (e.g., a set of assets including one or more assets), and additional data to apply a unique data analysis (i.e., unique to the particular insight provider among a plurality of insight providers), and to provide an analysis result. In some examples, the logic component 202 implements operationalized analysis, which can include, for example, one or more machine-learning models, and/or a set of expert rules derived from expert knowledge for a respective domain. For example, the logic component 202 can include a data model, through which data is processed to provide the analysis result. In some examples, each data model is domain-specific (e.g., the domain is predictive maintenance), and is specific to the respective insight provider. Accordingly, and as described in detail herein, insight providers can process data through respective data models to provide respective analysis results, which can be aggregated to provide an analysis result for a data analytics system as a whole.

In some implementations, the configuration component 204 provides one or more settings that control the logic and visualization of the particular insight provider 200. Example settings can include, without limitation, a time period for aggregating sensor data for display (e.g., 2 days, 3 weeks, etc.), attributes and their respective language-specific labels for display, configuration of color coding for assets, and a uniform resource locator (URL) of the backend system for creating a work activity. In some examples, a user interface (UI) enables a value for each setting to be provided. For example, an administrator can configure the insight provider 200 by providing values for settings through the UI.

In accordance with implementations of the present disclosure, the input assets define a set of assets (e.g., assets 110 of FIG. 1) that the insight provider 200 is to process, and the output assets is a sub-set of assets (e.g., a sub-set of the input assets) that is provided after the logic executes on the input assets. In some implementations, the visualization component 206 provides one or more data visualizations based on processing of the input assets, and/or the additional data. For example, the visualization component 206 can provide data and instructions that can be transmitted to a computing device (e.g., the client devices 102, 104), and can be processed by the computing device to provide the one or more data visualizations. In some examples, the visualization component enables interactive selection of filter criteria (e.g., during an exploration, described in further detail herein). Example data visualizations are described in further detail herein. In some implementations, additional data is processed by the logic component 202, and includes data objects associated with each of the input assets. In some examples, an input asset can be associated with a unique identifier, and the logic component 202 can query a data source based on the unique identifier. In some examples, the data source provides data associated with the input asset based on the unique identifier, which data is received by the logic component 202. In some implementations, the logic component 202 provides data (generated data) as a result of processing data associated with the input assets. In some examples, the generated data is associated with one or more input assets (e.g., unique identifiers of the one or more input assets), and is transmitted for storage in a data source (e.g., the data source that provides additional data).

In some implementations, the insight provider 200 provides evidence data based on processing input assets, and additional data using the logic. In some examples, evidence data can include, without limitation, individual data points (e.g., a specific instance of a derived signal), a specific work activity, composite data of a plurality of data points (e.g., snapshot of a map showing the critical assets overlaid on the map). In general, evidence packages are able to collect objects of different types (structured data, images, video, etc.).

In accordance with implementations of the present disclosure, and as described in further detail herein, each insight provider 200 can operate in a filter mode, or a data enrichment mode. In some examples, in the filter mode, the insight provider 200 serves as a filter for downstream insight providers 200 to remove data that may be less relevant to an asset exploration (discussed in further detail herein). In some examples, in the filter mode, multiple insight providers can be chained together to provide a so-called insight provider pipeline. In some examples, the data enrichment mode, the insight provider 200 enriches existing data by generating additional data (e.g., one or more scores). In some examples, for each input asset, one or more additional attributes can be generated by the insight provider 200 in the data enrichment mode. Example additional attributes can include, without limitation, aggregate values (e.g., key figures, health scores, etc.). In some examples, data enrichment can be performed as part of a batch process. In some examples, data enrichment can be performed on-demand (e.g., during an exploration, described in further detail herein).

Figure 3A:
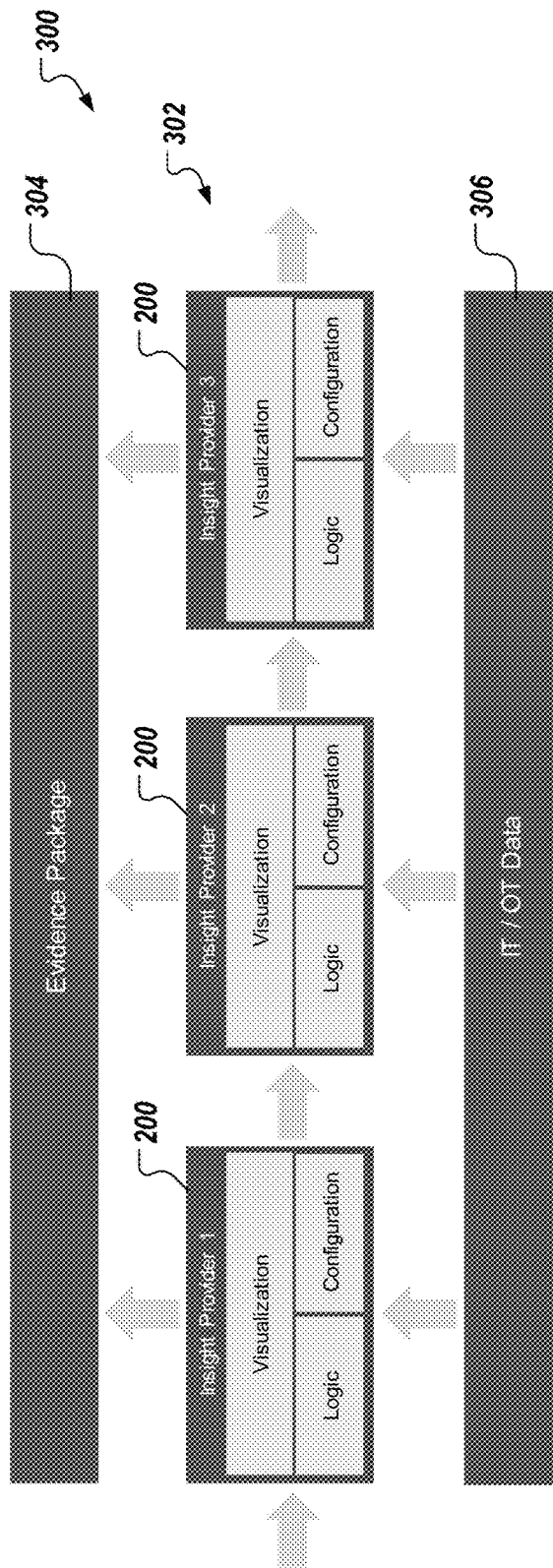
FIG. 3A depicts an example insight provider pipeline in accordance with implementations of the present disclosure.

FIG. 3A depicts an example insight provider pipeline 300 in accordance with implementations of the present disclosure. In general, an insight provider pipeline includes two or more insight providers. In the example of FIG. 3, the insight provider pipeline 300 includes three insight providers 200, described in further detail herein. In some implementations, each insight provider 200 processes input assets and additional data 304 to provide respective evidence data. In some examples, the evidence data of each insight provider is collected in an evidence package 306. In some implementations, and as described in further detail herein, one or more GUIs are provided, which each display one or more graphical representations based on data provided from the visualization components of the respective insight providers 200, and/or evidence data provided in the evidence package 306.

Figure 3B:
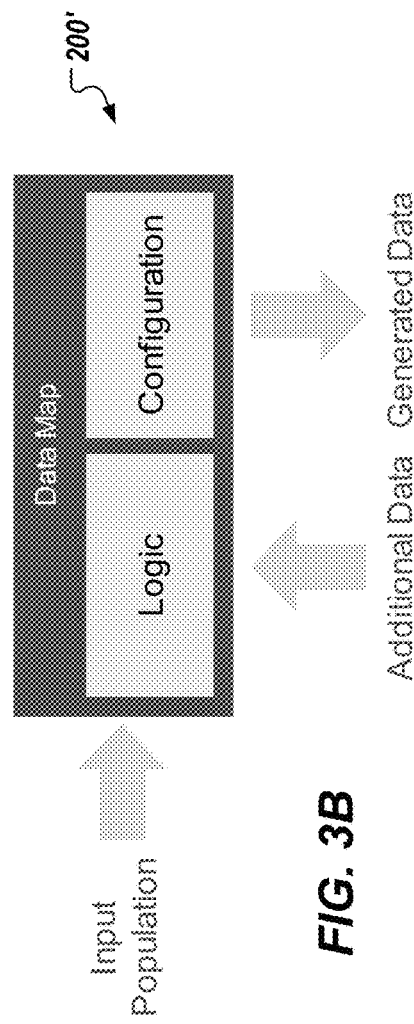
FIG. 3B depicts an example insight provider operating in a data enrichment mode in accordance with implementations of the present disclosure.

FIG. 3B depicts an example insight provider 200' operating in a data enrichment mode in accordance with implementations of the present disclosure. In some examples, the insight provider 200' provides values such as anomaly scores, remaining useful life scores, distance based probability of failure scores, and the like.

To provide further context, a data analytics system, such as SAP Predictive Maintenance and Service provided by SAP SE of Walldorf, Germany, targets domain experts and enterprise users who are in charge of monitoring the health of assets and planning maintenance activities. In some examples, through interaction with GUIs, users have the ability to view assets in a map, view a hierarchy of assets, view key performance indicators (KPIs), receive alerts (e.g., triggered by preconfigured rules), and view sensor data (e.g., in multi-dimensional, time-series chart). In the context of predictive maintenance, health scores for assets are computed using machine learning (e.g., programmed into the logic component of an insight providers). In some examples, a health score indicates the health status of a respective asset (e.g., the health score indicates the remaining useful life of the asset, the probability of failure of the asset, or anomaly scores). In some examples, the data analytics system operationalizes analytics and machine learning for consumption by domain experts and enterprise users.

In some implementations, the data analytics system is based on data management and data processing, and insight providers. In some examples, data management and data processing include data fusion based on concepts of the Lambda architecture, a generic, scalable, and fault-tolerant data processing architecture for big data. In some examples, the insight providers enable the operationalization of analytics for consumption by domain experts. In some implementations, the insight providers can be described as micro-services that provide respective portions of analytical functionality, which are plugged into applications. Accordingly, applications are composed of modular micro-services (insight providers), and can be enhanced or extended with additional analytical capabilities (e.g., by adding insight providers to the data analytics system).

In some implementations, an insight provider offers a specific analysis, whose result (insight) makes sense in the application domain. Example insights can include, without limitation, abnormal exhaust temperature of an engine on a specific airplane, a high frequency of low-oil-level alerts in a fleet of vehicles, a geo-fenced area of oil pipelines that show a high degradation in remaining useful life. In some implementations, an insight provider implements operationalized analytics created by data analysts and/or data scientists, and validated by domain experts and enterprise users. The logic of the insight provider (e.g., coded into the respective logic component) may contain derived signal calculations, key value calculations, statistical models, and/or predictive models.

In general, the data analytics system includes a data connectivity layer, and a stream processing layer. In some examples, the data connectivity layer is responsible for transferring data collected through various protocols, from assets, or device associated with assets, to a central data repository (e.g., database). In some examples, data is provided by multiple networked devices, such as so-called Internet-of-Things (IoT) devices. In some examples, the data connectivity layer provides underlying network connectivity, device management capabilities (e.g., pushing configurations to devices), and monitoring of devices. In some examples, the stream processing layer handles computations on the incoming data stream. Computations can range from relatively simple computations (e.g., detecting sensor value threshold violations) to relatively complex computations (e.g., applying predictive models to streaming data 4 determining the probability of a component resulting in a warranty claim as the component goes through an assembly line).

In some examples, management of enterprise data (e.g., IT data), and telematics and sensor data (e.g., OT data) includes a data ingestion process. In some examples, the data ingestion process includes parsing of raw data, and converting the raw data into a processable format. In some examples, IT data is replicated from an enterprise system. Example enterprise systems can include, without limitation, SAP Enterprise Resource Planning (ERP), and SAP Customer Relationship Management (CRM), both provided by SAP SE of Walldorf, Germany. In some examples, one or more fusion views provide transformations such as pivot transforms, enrichment (including joining data that might be computationally expensive to be done later), syntactic cleansing (does not require an understanding of the meaning of data, and semantic cleansing.

In some examples, sensor metadata management relates to the metadata of measurements and events (e.g., the type of measurement, textual description, unit of measure, time frequency for continuous measurements, domain values for the discrete measurements, software configuration version, severity of events, time interval for event measurements). In some examples, sensor metadata management enables the combination of machine data (e.g., from IoT devices) with enterprise data (e.g., from enterprise systems) in the data fusion layer.

Figure 4A:
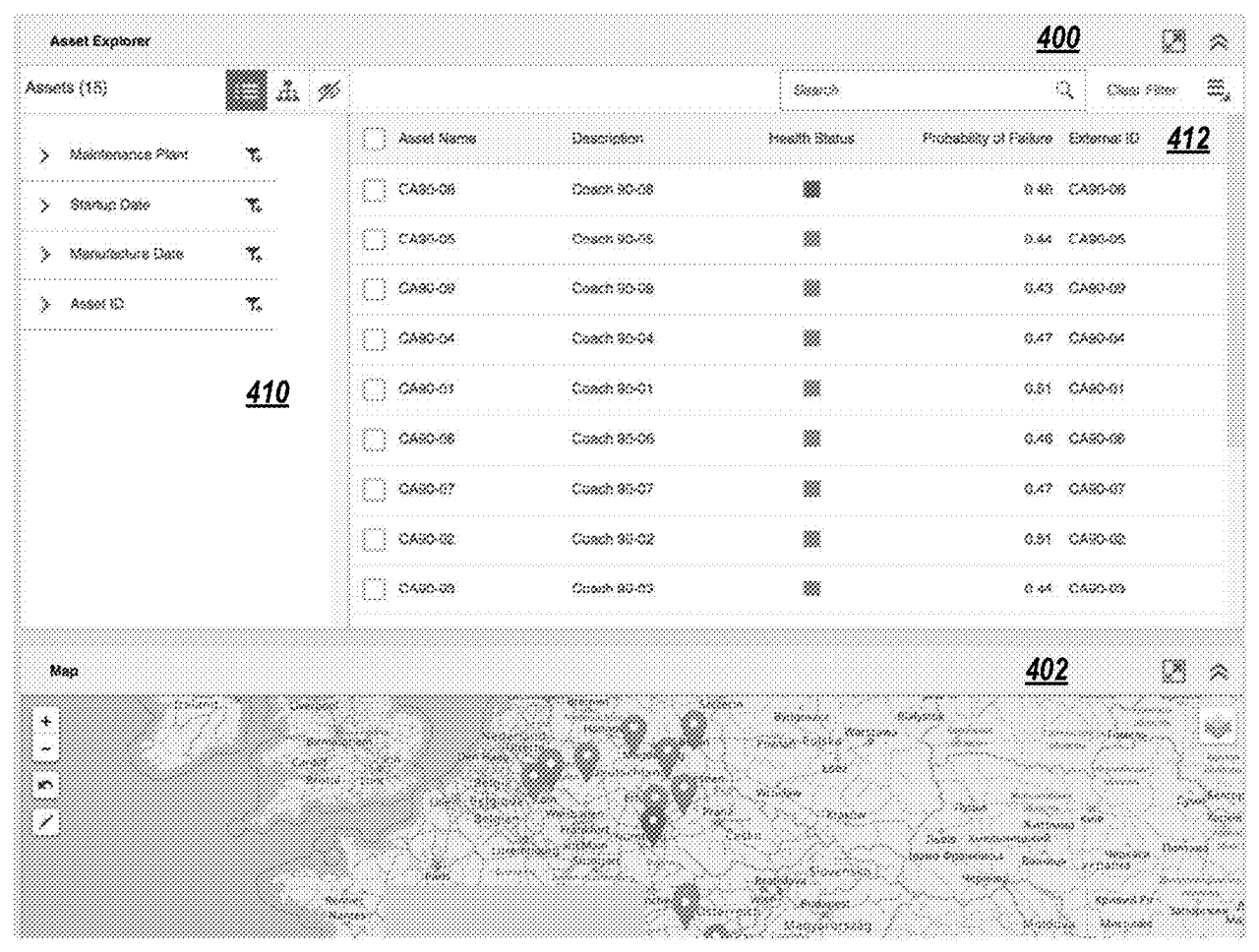
Figure 4B:
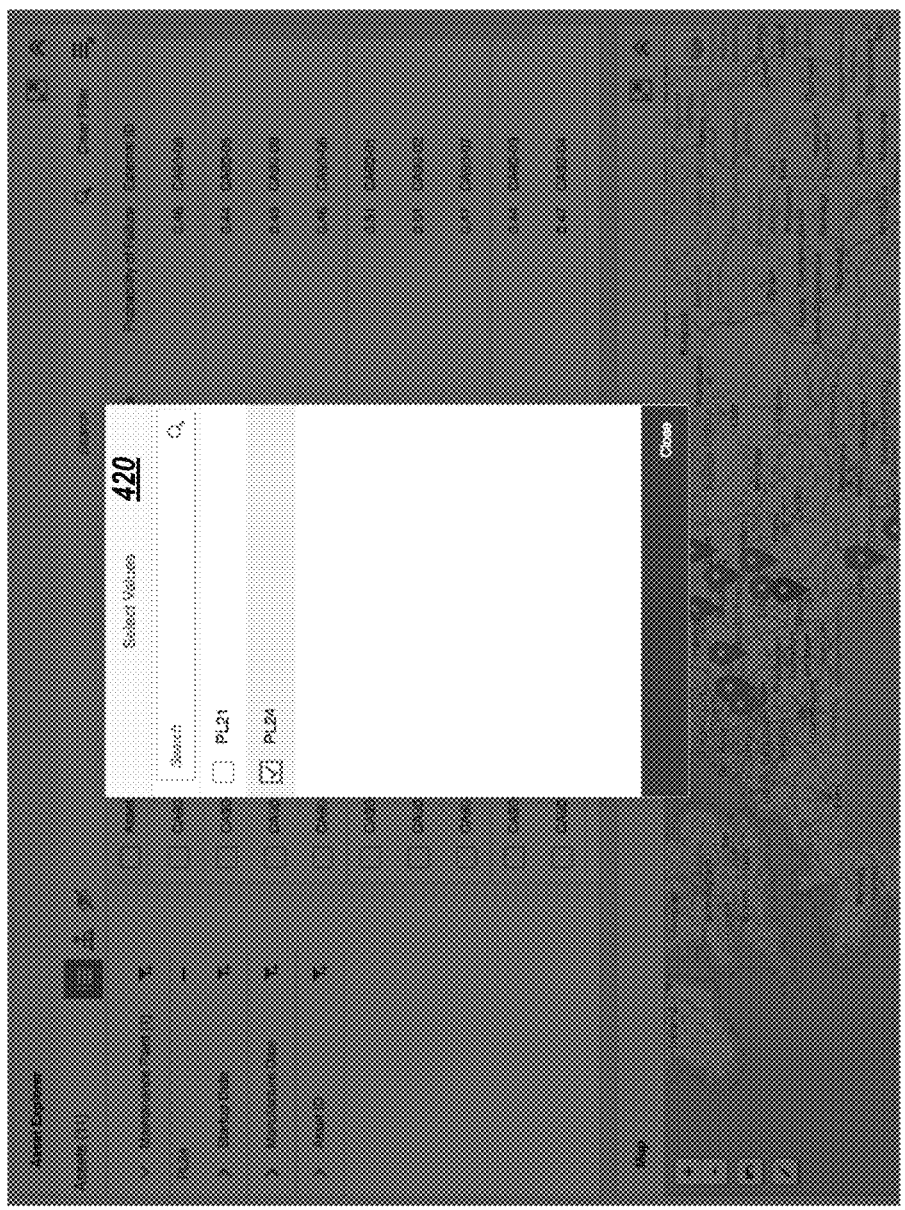
Figure 4C:
Figure 4D:
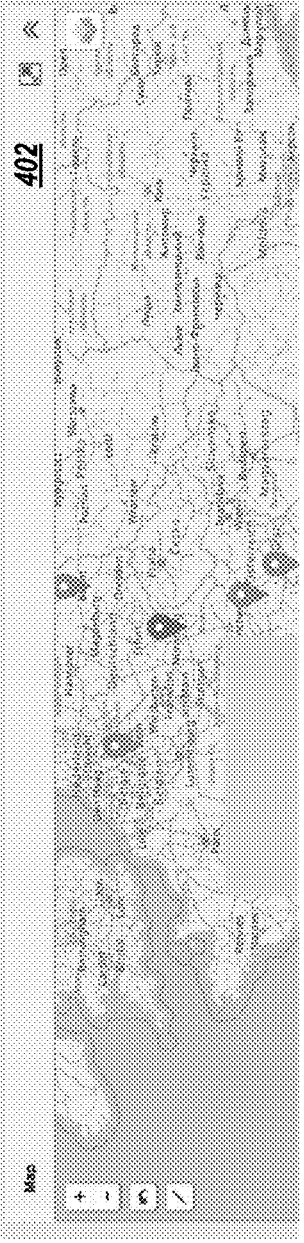
Figure 4E:
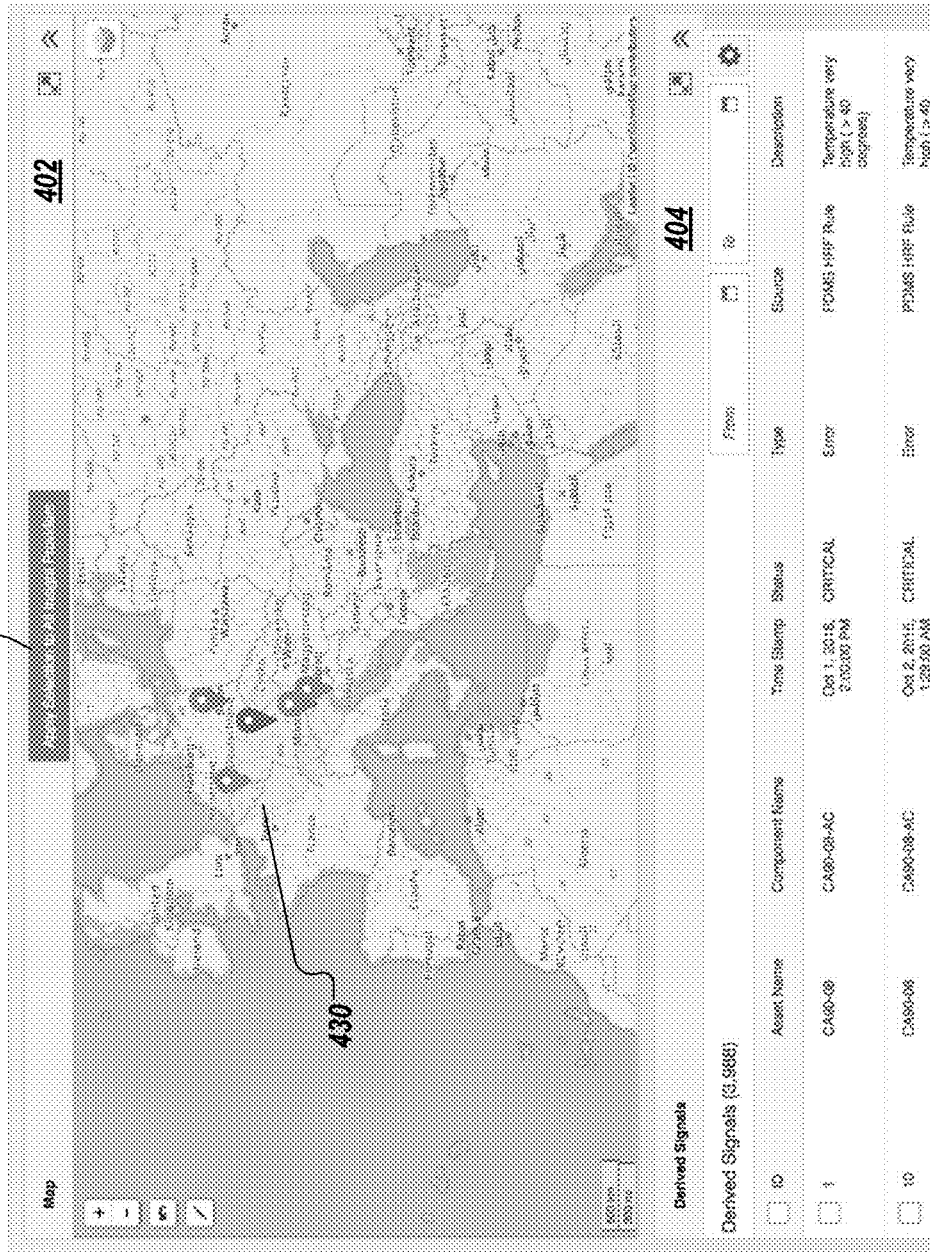
Figure 4F:
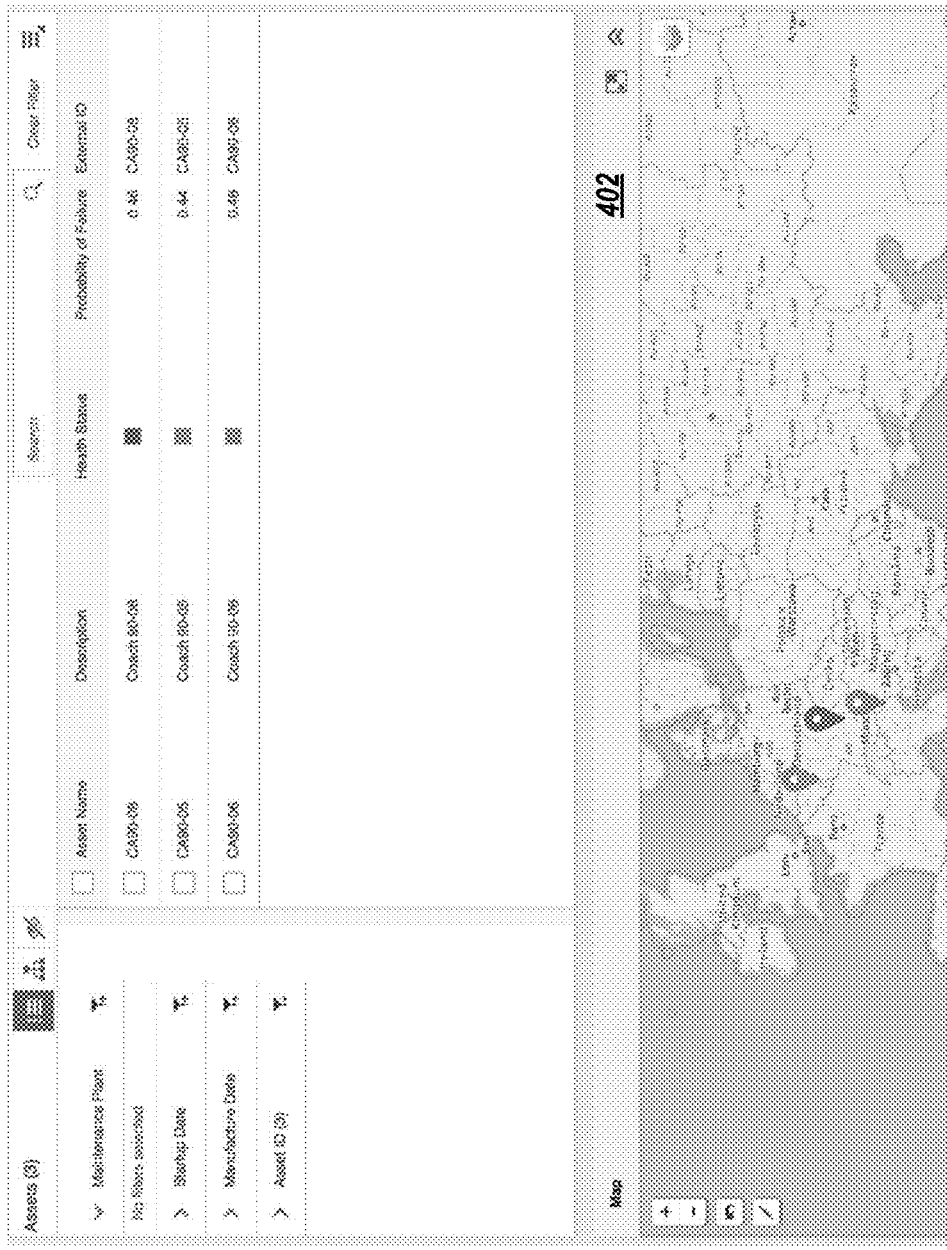
Figure 4G:

FIGS. 4A-4G depict screenshot of an example GUI progression in accordance with implementations of the present disclosure. More particularly, FIGS. 4A-4G depict an example exploration that can be conducted during an interactive session using a data analytics system including insight providers of the present disclosure. In some examples, a user (e.g., a domain expert) can interact with the GUIs to explore data around a plurality of assets in the predictive maintenance context. The example GUIs include an asset explorer GUI 400 (FIGS. 4A, 4C, 4D, and 4F), a map GUI 402 (FIGS. 4A, and 4C-4F), a derived signals GUI 404 (FIG. 4E), a 3D chart GUI 406 (FIG. 4G), and a work activities GUI 408 (FIG. 4G). The examples of FIGS. 4A-4G includes predictive maintenance related to air conditioner (A/C) units (assets) of trains operating in Germany.

In accordance with implementations of the present disclosure, each GUI is associated with an underlying insight provider. In some examples, the insight providers underlying the GUIs of FIGS. 4A-4G are configured as an insight provider pipeline (as part of an application), as described herein with reference to FIG. 3A. In some examples, the output of an insight provider is provided as input to one or more other insight providers. In general, and as described herein with reference to the example progression of FIGS. 4A-4G, a user can interact with the GUIs to orchestrate the insight providers in an effort to drill-down to one or more particular assets to, for example, to perform one or more tasks related to the particular asset(s) (e.g., issue a maintenance ticket).

With particular reference to FIG. 4A, the asset explorer GUI 400, and a portion of the map GUI 402 are depicted. In the depicted example, the asset explorer GUI 400 includes a menu 410, and an asset view 412. In some examples, the menu 410 provides user-selectable parameters to filter assets displayed in the asset view 412. In the depicted example, the asset view 412 is provided as a table view. It is contemplated, however, that assets can be displayed in any appropriate view (e.g., asset hierarchy). In the depicted examples, the map GUI 402 includes a geographical map having respective pin icons, each indicating a geographic location of a respective asset in the asset view 412.

In accordance with implementations of the present disclosure, the asset explorer GUI 400, and the map GUI 402 provide data from respective insight providers, in combination with IT data and/or OT data. For example, an insight provider underlying the asset explorer GUI 400 can receive data associated with respective assets (e.g., environmental data, performance data from IoT devices), and can determine a health status, and a probability of failure for each asset. In the depicted example, the health status is communicated by a color value (e.g., red, orange, green), and the probability of failure is provided by a numeric value. The asset explorer GUI 400 also displays IT data and/or OT data received from an enterprise system. In the depicted example, the asset view 412 displays the health status and probability of failure in hand with respective asset names, descriptions, and external identifiers provided from an enterprise system (e.g., an ERP system). In the depicted example, the map GUI 402 depicts the health status (e.g., color of pin icon) and location of the respective assets of the asset view 412.

With reference to FIGS. 4B and 4C, and as introduced above, the menu 410 provides user-selectable parameters to filter assets displayed in the asset view 412. For example, in response to use selection of a filter icon corresponding to "Maintenance Plant" of the menu 410, a value selection interface 420 is displayed. In the depicted example, a user has selected a particular maintenance plant (PL24). In response, the asset view 412, and the map GUI 402 can be modified to display only data relating to assets associated with the particular maintenance plant.

With particular reference to FIG. 4C, the user can select particular assets from the asset view 412 for further analysis. In the depicted example, users-selected assets are indicated by the user checking a check-box of the assets in the asset view 412. In some examples, in response to user selection of at least one particular asset, an application icon 422 is displayed. In response to user selection of the application icon 422, the user-selected assets are applied to the insight providers underlying the GUIs. That is, for example, the input assets input to the insight providers respectively underlying the asset explorer GUI 400 and the map GUI 402 are modified to include only the user-selected assets. FIG. 4D depicts the result to the asset explorer GUI 400 and the map GUI 402 from applying the user-selected assets of FIG. 4C.

With particular reference to FIG. 4E, the map GUI 402 depicts pin icons for the assets remaining in the asset view 412 after user-selection, as described above with reference to FIGS. 4C and 4D. A portion of the derived signals GUI 404 is depicted, and includes signals related to the remaining assets. In the depicted example, the signals include an indication that a temperature associated with a particular asset (e.g., CA90-08) has exceeded a threshold temperature (e.g., 40 degrees) based on a particular rule (e.g., PDMS HRF Rule). In some examples, the rule is applied by the insight provider underlying the derived signals GUI 404.

In some implementations, the user can select particular assets for further analysis using the map GUI 402. In the depicted example, the user can draw a geometric shape 430 defining a boundary. In some examples, if a pin icon is within the geometric shape 430, the asset corresponding to the pin icon is selected. In response to user selection of at least one particular asset (e.g., by fencing in pin icons using the geometric shape within the map GUI 402), the application icon 422 is displayed. In response to user selection of the application icon 422, the user-selected assets are applied to the insight providers underlying the GUIs. FIG. 4F depicts the asset explorer GUI 400 and the map GUI 402 in response to user selection using the map GUI 402 (see FIG. 4E).

With reference to FIG. 4G, the 3D chart GUI 406, and the work activities GUI 408 are depicted and provide graphical displays based on the user selections described above with reference to FIGS. 4E and 4F. In the depicted example, the 3D chart GUI 406 provides a multi-dimensional graphical representation of assets and temperatures recorded for the assets over time. In accordance with implementations of the present disclosure, the user can provide input to the 3D chart GUI 406. In the depicted example, the user can provide input defining a threshold temperature value. In response to the user-defined threshold temperature value, a sub-set of assets is selected (e.g., assets associated with temperatures that exceed the threshold temperature value), and the application icon 422 is displayed. In response to user selection of the application icon 422, the user-selected assets are applied to the insight providers underlying the GUIs.

Although a 3D chart GUI 406 is depicted in the examples described herein, it is contemplated that any chart GUI can be provided (e.g., 2D chart GUI).

In the depicted example, the work activities GUI 408 provides a graphical representation of a plurality of tasks being performed with respect to assets. In the depicted example, the graphical representation includes a table providing rows, each associated with a respective task, and columns, each providing information associated with the tasks.

Figure 5:
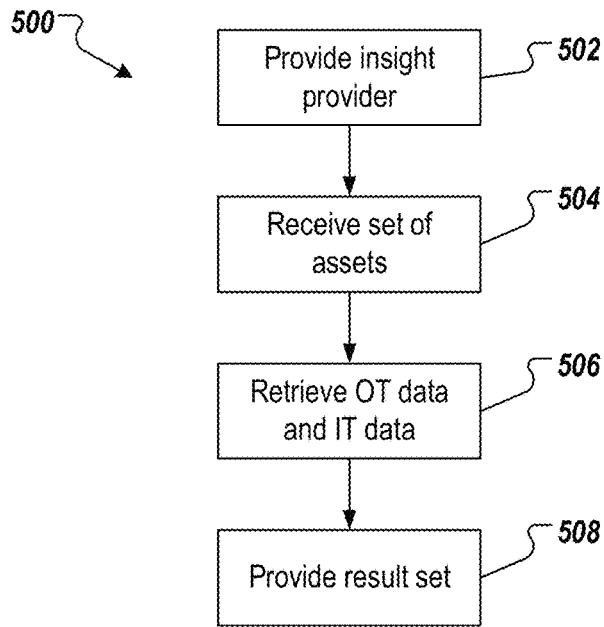
FIG. 5 depicts an example process that can be executed in accordance with implementations of the present disclosure.

FIG. 5 depicts an example process 500 that can be executed in accordance with implementations of the present disclosure. In some examples, the example process 500 can be provided by one or more computer-executable programs executed using one or more computing devices.

An insight provider is provided (502). For example, an insight provider is provided as one or more computer-executable programs executed using one or more computing devices (e.g., the server system 108 of FIG. 1). In some examples, the insight provider includes a logic component and a configuration component, as described herein. For example, the logic component includes a domain-specific model, and the configuration component includes one or more parameter values for processing data using the domain-specific model. A set of assets is received (504). For example, the server system 108 receives the set of assets (e.g., based on user input identifying assets to be analyzed). In some examples, the set of assets includes data indicative of one or more assets, as described herein.

Asset data is retrieved (506). For example, the server system 108 retrieves asset data associated with at least one asset of the set of assets. In some examples, and as described in detail herein, the asset data includes OT data, and IT data, the OT data being provided from one or more networked devices, the IT data being provided from one or more enterprise systems. A result set is provided (508). For example, and as described herein, the OT data and the IT data are processed using the domain-specific model of the logic component to provide the result set. In some examples, the result set includes one or more of another set of assets and enriched data.

Figure 6:
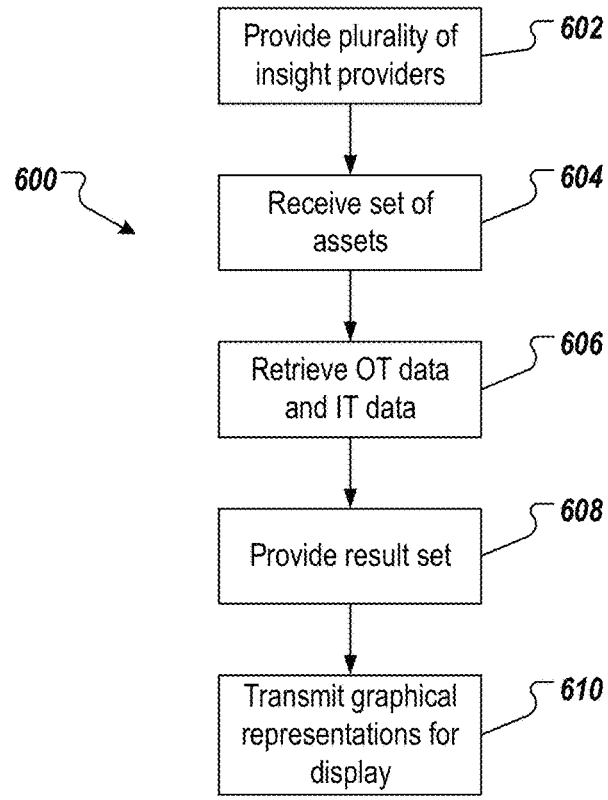
FIG. 6 depicts an example process that can be executed in accordance with implementations of the present disclosure.

FIG. 6 depicts an example process 600 that can be executed in accordance with implementations of the present disclosure. In some examples, the example process 600 can be provided by one or more computer-executable programs executed using one or more computing devices.

A plurality of insight providers is provided (602). For example, each insight provider of the plurality of insight providers is provided as one or more computer-executable programs executed using one or more computing devices (e.g., the server system 108 of FIG. 1). In some examples, each insight provider includes a logic component and a configuration component, each logic component including a respective domain-specific model, and each configuration component including one or more parameter values for processing data using the respective domain-specific model. A set of assets is received (604). For example, the server system 108 receives the set of assets (e.g., based on user input identifying assets to be analyzed). In some examples, the set of assets includes data indicative of one or more assets, as described herein.

Asset data is retrieved (606). For example, the server system 108 retrieves asset data associated with at least one asset of the set of assets. In some examples, and as described in detail herein, the asset data includes OT data, and IT data, the OT data being provided from one or more networked devices, the IT data being provided from one or more enterprise systems. A result set is provided (608). For example, and as described herein, the OT data and the IT data are processed using respective domain-specific models of the logic components of the insight providers to provide the result set. In some examples, the result set includes one or more of another set of assets and enriched data.

Graphical representations are transmitted for display (610). For example, the server system 108 transmits instructions for display of graphical representation in a display of the client device 102, 104. In some examples, and as described herein, the graphical representations are displayed in a plurality of GUI that are respectively specific to an insight provider of the plurality of insight providers. In some examples, each the one or more graphical representations is at least partially based on one or more of the result set and the other result set. In some examples, the graphical representations are provided from visualization components of the respective insight providers.

Implementations of the present disclosure provide one or more of the following example advantages. In general, the insight providers surface insights derived from underlying combination of IT data and OT data in an easy and consumable manner. In some examples, chaining of the insight providers enables domain users to monitor assets for health and maintenance issues (e.g., by filtering and chaining insight providers in any order). In contrast, traditional data analytics systems require IT personnel to implement data cubes, or data marts for domain users to slice and dice (manipulate) the data. The insight provider approach of the present disclosure guides users to more time- and resource-efficiently find the set of assets of interest in following up with subsequent processes (e.g., monitoring for maintenance, detecting emerging issues in a fleet of assets, etc.)

Figure 7:
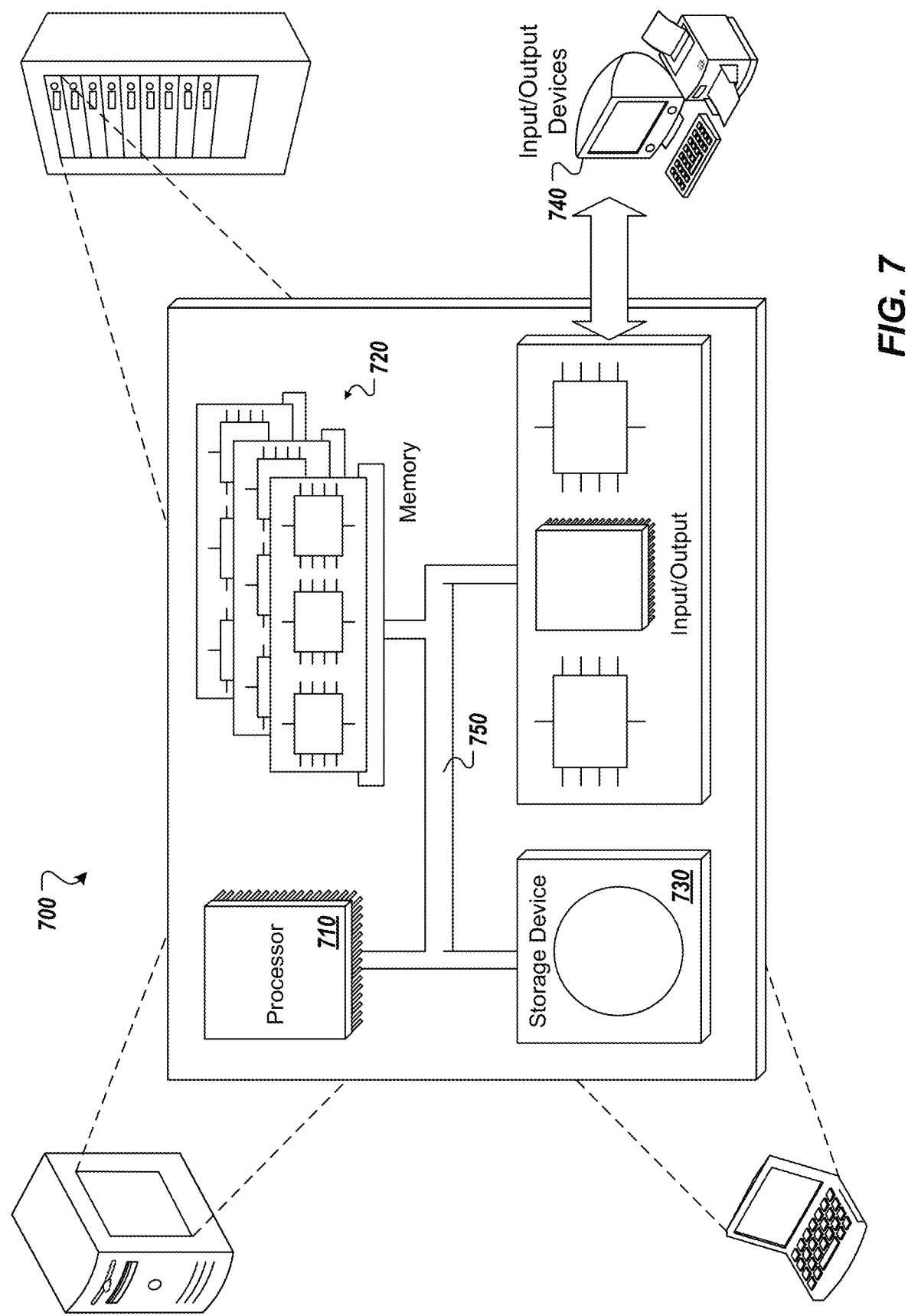
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing a data analytics system, the method being executed by one or more processors and comprising:
providing, by the one or more processors, a plurality of insight providers within the data analytics system, a first insight provider comprising a first logic component and a first configuration component that provides a first set of settings to control logic and visualization specific to the first insight provider, the first logic component comprising a first model that is specific to a first aspect of predictive maintenance of assets to process data based on the first settings of the first configuration component and at least one input asset to provide a first analysis result that is unique to the first insight provider;
displaying an asset view of the data analytics system that provides graphical representations of assets based on the first analysis result, the graphical representations being user-selectable;
receiving, through the asset view, user input representing a selection of a first set of assets, the user input comprising data indicative of one or more assets, at least one asset in the first set of assets having a unique identifier assigned thereto;
retrieving, by the one or more processors, asset data associated with the at least one asset of the first set of assets, at least a portion of the asset data being retrieved by the logic component of an insight provider querying a data source based on the unique identifier;
processing, by the one or more processors, the asset data through a second insight provider to provide a first result set, the first result set comprising one or more of a second set of assets and enriched data, the second insight provider comprising a second logic component and a second configuration component that provides a second set of settings to control logic and visualization specific to the second insight provider, the second logic component comprising a second model that is specific to a second aspect of the predictive maintenance to process data based on the second settings of the second configuration component; and
transmitting, by the one or more processors, one or more graphical representations for display in a plurality of graphical user interface (GUIs) that are respectively specific to an insight provider of the plurality of insight providers, each of the one or more graphical representations being at least partially based on one or more of the first result set and the second set of assets, and being provided from visualization components of the respective insight providers responsive to the set of settings of the respective configuration components.

2. The method of claim 1, further comprising:
receiving user input provided through a first GUI of the plurality of GUIs, the user input indicating a sub-set of assets selected by the user;
processing, by the first insight provider associated with the first GUI, asset data associated with the sub-set of assets to provide input to the second insight provider; and
transmitting one or more revised graphical representations to the first GUI and a second GUI associated with the second insight provider, each of the one or more revised graphical representations being based on one or more of the sub-set of assets, and the input to the second insight provider.

3. The method of claim 2, wherein the second insight provider executes in a data enrichment mode to provide enriched data, at least one graphical representation comprising the enriched data.

4. The method of claim 2, wherein the first insight provider executes in a filter mode, and the input comprises at least one asset of the sub-set of assets.

5. The method of claim 1, wherein the asset data comprises operational technology (OT) data and information technology (IT) data that are processed using respective domain-specific models of the logic components of the insight providers.

6. The method of claim 1, wherein the first model of the first insight provider generates health scores of assets.

7. The method of claim 1, wherein the second model of the second insight provider generates predictions responsive to streaming data of assets.

8. A non-transitory computer-readable storage medium coupled to one or more processors and having instructions stored thereon which, when executed by the one or more processors, cause the one or more processors to perform operations for providing a data analytics system, the operations comprising:

provididing, by the one or more processors, a plurality of insight providers within the data analytics system, a first insight provider comprising a first logic component and a first configuration component that provides a first set of settings to control logic and visualization specific to the first insight provider, the first logic component comprising a first model that is specific to a first aspect of predictive maintenance of assets to process data based on the first settings of the first configuration component and at least one input asset to provide a first analysis result that is unique to the first insight provider;

displaying an asset view of the data analytics system that provides graphical representations of assets based on the first analysis result, the graphical representations being user-selectable;

receiving, through the asset view, user input representing a selection of a first set of assets, the user input comprising data indicative of one or more assets, at least one asset in the first set of assets having a unique identifier assigned thereto;

retrieving, by the one or more processors, asset data associated with the at least one asset of the first set of assets, at least a portion of the asset data being retrieved by the logic component of an insight provider querying a data source based on the unique identifier;

processing, by the one or more processors, the asset data through a second insight provider to provide a first result set, the first result set comprising one or more of a second set of assets and enriched data, the second insight provider comprising a second logic component and a second configuration component that provides a second set of settings to control logic and visualization specific to the second insight provider, the second logic component comprising a second model that is specific to a second aspect of the predictive maintenance to process data based on the second settings of the second configuration component; and transmitting, by the one or more processors, one or more graphical representations for display in a plurality of graphical user interface (GUIs) that are respectively specific to an insight provider of the plurality of insight providers, each of the one or more graphical representations being at least partially based on one or more of the first result set and the second set of assets, and being provided from visualization components of the respective insight providers responsive to the set of settings of the respective configuration components.

9. The non-transitory computer-readable storage medium of claim 8, wherein operations further comprise:

receiving user input provided through a first GUI of the plurality of GUIs, the user input indicating a sub-set of assets selected by the user;

processing, by the first insight provider associated with the first GUI, asset data associated with the sub-set of assets to provide input to the second insight provider; and transmitting one or more revised graphical representations to the first GUI and a second GUI associated with the second insight provider, each of the one or more revised graphical representations being based on one or more of the sub-set of assets, and the input to the second insight provider.

10. The non-transitory computer-readable storage medium of claim 9, wherein the second insight provider executes in a data enrichment mode to provide enriched data, at least one graphical representation comprising the enriched data.

11. The non-transitory computer-readable storage medium of claim 9, wherein the first insight provider executes in a filter mode, and the input comprises at least one asset of the sub-set of assets.

12. The non-transitory computer-readable storage medium of claim 8, wherein the asset data comprises operational technology (OT) data and information technology (IT) data that are processed using respective domain-specific models of the logic components of the insight providers.

13. The non-transitory computer-readable storage medium of claim 8, wherein the first model of the first insight provider generates health scores of assets.

14. The non-transitory computer-readable storage medium of claim 8, wherein the second model of the second insight provider generates predictions responsive to streaming data of assets.

15. A system, comprising:

a computing device; and a computer-readable storage device coupled to the computing device and having instructions stored thereon which, when executed by the computing device, cause the computing device to perform operations for providing a data analytics system, the operations comprising:

providing, by the one or more processors, a plurality of insight providers within the data analytics system, a first insight provider comprising a first logic component and a first configuration component that provides a first set of settings to control logic and visualization specific to the first insight provider, the first logic component comprising a first model that is specific to a first aspect of predictive maintenance of assets to process data based on the first settings of the first configuration component and at least one input asset to provide a first analysis result that is unique to the first insight provider;

displaying an asset view of the data analytics system that provides graphical representations of assets based on the first analysis result, the graphical representations being user-selectable;

receiving, through the asset view, user input representing a selection of a first set of assets, the user input comprising data indicative of one or more assets, at least one asset in the first set of assets having a unique identifier assigned thereto;

retrieving, by the one or more processors, asset data associated with the at least one asset of the first set of assets, at least a portion of the asset data being retrieved by the logic component of an insight provider querying a data source based on the unique identifier;

processing, by the one or more processors, the asset data through a second insight provider to provide a first result set, the first result set comprising one or more of a second set of assets and enriched data, the second insight provider comprising a second logic component and a second configuration component that provides a second set of settings to control logic and visualization specific to the second insight provider, the second logic component comprising a second model that is specific to a second aspect of the predictive maintenance to process data based on the second settings of the second configuration component; and transmitting, by the one or more processors, one or more graphical representations for display in a plurality of graphical user interface (GUIs) that are respectively specific to an insight provider of the plurality of insight providers, each of the one or more graphical representations being at least partially based on one or more of the first result set and the second set of assets, and being provided from visualization components of the respective insight providers responsive to the set of settings of the respective configuration components.

16. The system of claim 15, wherein operations further comprise:

receiving user input provided through a first GUI of the plurality of GUIs, the user input indicating a sub-set of assets selected by the user;

processing, by the first insight provider associated with the first GUI, asset data associated with the sub-set of assets to provide input to the second insight provider; and transmitting one or more revised graphical representations to the first GUI and a second GUI associated with the second insight provider, each of the one or more revised graphical representations being based on one or more of the sub-set of assets, and the input to the second insight provider.

17. The system of claim 16, wherein the second insight provider executes in a data enrichment mode to provide enriched data, at least one graphical representation comprising the enriched data.

18. The system of claim 16, wherein the first insight provider executes in a filter mode, and the input comprises at least one asset of the sub-set of assets.

19. The system of claim 15, wherein the asset data comprises operational technology (OT) data and information technology (IT) data that are processed using respective domain-specific models of the logic components of the insight providers.

20. The system of claim 15, wherein the first model of the first insight provider generates health scores of assets.

* * * * *